US012007719B2

(12) United States Patent
Papi et al.

(10) Patent No.: US 12,007,719 B2
(45) Date of Patent: Jun. 11, 2024

(54) MOON-PHASE DISPLAY DEVICE

(71) Applicant: Manufacture d'Horlogerie Audemars Piguet SA, Le Brassus (CH)

(72) Inventors: Giulio Papi, La Chaux-de-Fonds (CH); Julien Martel, Boudry (CH)

(73) Assignee: Manufacture D'Horlogerie Audemars Piguet SA, Le Brassus (CH)

( * ) Notice: Subject to any disclaimer, the term of this patent is extended or adjusted under 35 U.S.C. 154(b) by 762 days.

(21) Appl. No.: 17/059,037

(22) PCT Filed: Jun. 18, 2019

(86) PCT No.: PCT/IB2019/055102

§ 371 (c)(1),
(2) Date: Nov. 25, 2020

(87) PCT Pub. No.: WO2019/244032

PCT Pub. Date: Dec. 26, 2019

(65) Prior Publication Data

US 2021/0208539 A1 Jul. 8, 2021

(30) Foreign Application Priority Data

Jun. 18, 2018 (CH) ........................................ 767/18

(51) Int. Cl.
*G04B 19/26* (2006.01)

(52) U.S. Cl.
CPC .................................. *G04B 19/268* (2013.01)

(58) Field of Classification Search
None
See application file for complete search history.

(56) References Cited

U.S. PATENT DOCUMENTS

| | | | |
|---|---|---|---|
| 508,467 | A | 11/1893 | Clark |
| 5,650,736 | A | 7/1997 | Pun et al. |
| 7,196,973 | B2 | 3/2007 | Born et al. |

FOREIGN PATENT DOCUMENTS

| | | | |
|---|---|---|---|
| EP | 1475680 | A1 | 11/2004 |
| EP | 1615086 | A1 | 1/2006 |
| EP | 1701227 | A1 | 9/2006 |
| FR | 2614445 | A1 | 10/1988 |
| GB | 2438684 | A | 12/2007 |
| WO | WO-2011113170 | A1 | 9/2011 |

OTHER PUBLICATIONS

International Search Report for PCT/IB2019/055102, dated Nov. 13, 2019, 2 pgs.

*Primary Examiner* — renee s luebke
*Assistant Examiner* — Matthew Hwang
(74) *Attorney, Agent, or Firm* — Blank Rome LLP

(57) ABSTRACT

Device for displaying phases of the moon with a fist display member (80) bearing a plurality of first images (81-86) at least partially representing the moon, a display zone, driving means (22, 23, 25, 40, 41, 43, 63, 71, 72, 61, 62) arranged to displace, by successive jumps, the first display member (80) relative to the display zone, to display a succession of representations of the moon. An original feature of the invention is that the periods of display of the first images are not all equal.

12 Claims, 7 Drawing Sheets

MOON-PHASE DISPLAY DEVICE

RELATED APPLICATIONS

This application is a national phase application of International Application No. PCT/IB2019/055102, filed on Jun. 18, 2019, which claims the benefit of Swiss Patent Application No. CH00767/18, filed on Jun. 18, 2018. The entire contents of these applications are hereby incorporated by reference.

TECHNICAL FIELD

The present invention relates to a horological device for displaying phases of the moon in particular, but not exclusively, on the dial of a wristwatch, of a pocket watch, of a display on the back of the watch, or any other display.

STATE OF THE ART

Devices for displaying phases of the moon are well known in the horology field, Conventionally, the phases of the moon are indicated by a movable disk which performs a complete revolution every two months, on which the moon is represented twice. An aperture of a particular form in the dial reveals a part of the one or the other image so as to show a form corresponding to the phase of the moon. U.S. Pat. No. 508,467 and many other similar publications illustrate this type of device.

The form of the moon displayed by these devices is correct only at the full moon and in the phases close to the new moon, when the celestial body is crescent shaped. These displays are incapable of reproducing the faithful image of the moon at the quarters, when the line of separation between the light zone and the dark zone is straight, and between the first and last quarters, when the moon is hunchbacked.

Other known devices, for example disclosed by EP1701227, propose displays in which a disk bearing a series of images of the moon in its different aspect is displaced facing a window which reveals only one representation at a time.

Other devices, for example those proposed by EP1615086 and EP1475680, propose displays in which the image of the moon is created by a display member having dark and light zones of particular form that are displaced in complex fashion behind a window. These mechanisms provide compositions of rotations and slides, or else large and small arbitrary rotations on each transition.

U.S. Pat. No. 5,650,736 discloses a display with two rotating display members superposed behind a window, one having light and dark zones, the other with light, dark and transparent zones. This display is relatively bulky.

Also known are watches in which the phase of the moon is indicated by a small dark and light globe, rotating about an axis of rotation like a miniature celestial body. This way of displaying the phase of the moon is certainly faithful, but does also occupy a very considerable thickness.

BRIEF SUMMARY OF THE INVENTION

One aim of the present invention is to propose a device for displaying phases of the moon that is free of the limitations of the known solutions, which is both realistic and has a smaller footprint.

In the description of the embodiments and in the claims, the term "lunation" is used to designate a time interval whose length is, at least approximately, one synodic month of 29 days, 12 hours, 44 minutes and 2.8 seconds, i.e. 29.530588 days. Depending on the quality of the watch and the accuracy sought, the display mechanism could perform a complete cycle in a lunation of 29.53125 days, 29.5 days, 30 days, or of another period close to the exact value sought.

According to the invention, these aims are achieved notably by means of the subject matter of the main claim, and notably by a device for displaying phases of the moon for a timepiece comprising a first display member bearing a plurality of first images at least partially representing the moon, a display zone and driving means arranged so as to displace, by successive jumps, the first display member with reference to the display zone in order to display a succession of representations of the moon, the device being unique in that the periods of display of the first images are not all equal.

Thus, the device makes it possible to obtain a high degree of accuracy in the display of the most recognizable phases of the moon such as the full moon, the halfmoon or the new moon, while the intermediate phases, that are less singular, remain visible for a longer period. That makes it possible to obtain a more realistic display while using a reduced number of images. Alternatively, the invention makes it possible to increase the size of the images without increasing the size of the display disk or altering the realism of the display.

The free programming of the variable jumps for each image also allows for a greater degree of freedom in designing a mechanism in which the lunation period of the display which is close to the real period of lunation and thus reduce, even eliminate, the need to set the display.

According to another aspect, the invention proposes a device also comprising a second display member bearing second images and that can be displaced with reference to the display zone by the driving means to successively reveal the second images in the display zone in which a second image forms, in combination with a first image of the first display member, a representation of the phase of the moon.

Advantageously, the representation of a phase of the moon by the combination of two images makes it possible to increase the number of representations of the moon without increasing the surface area occupied by the images, a partial image being able to appear in several distinct representations. Alternatively, the invention makes it possible, for a given number of representations of the moon, to increase their size without increasing that of the display disk.

The dependent claims illustrate advantageous variants with non-essential features, for example the use of concentric disks for the display members and that of an instantaneous jump mechanism.

Other advantageous variants claimed concern program wheels for actuating the first display member or the second display member at predetermined instants of the lunation, the program wheels being able to be connected to a timepiece movement to rotate with a period related to the period of the lunation, for example a complete revolution or two complete revolutions per lunation (if using symmetry between the waxing phase and the waning phase of the moon). Moreover, the program wheels have a profile configured to displace the first display member and/or the second display member on passing of said determined instants of the lunation.

In a preferred variant, the program wheels are superposed axially, rotate together, and each have an intermittent toothing driving two drive wheels integral to the first, respectively second, display disk. The drive wheels can be held in stable position each by a jumper.

The rotation by instantaneous or dragging jumps of the program wheels can be obtained by a lever cooperating with a star wheel integral to said program wheels. The star wheel preferably being held in stable position by a jumper. Depending on the period chosen for actuation of the display, a shift of the jump instant is created each day, thus to avoid observing a transition phase of the display at the very moment of observing it, an instantaneous jump makes it possible to observe a realistic representation of the phase of the moon at all times.

BRIEF DESCRIPTION OF THE FIGURES

Examples of implementation of the invention are indicated in the description illustrated by the attached figures in which

In FIG. 4 the display disks have been removed.

EXAMPLES OF EMBODIMENTS OF THE INVENTION

Figure 1:
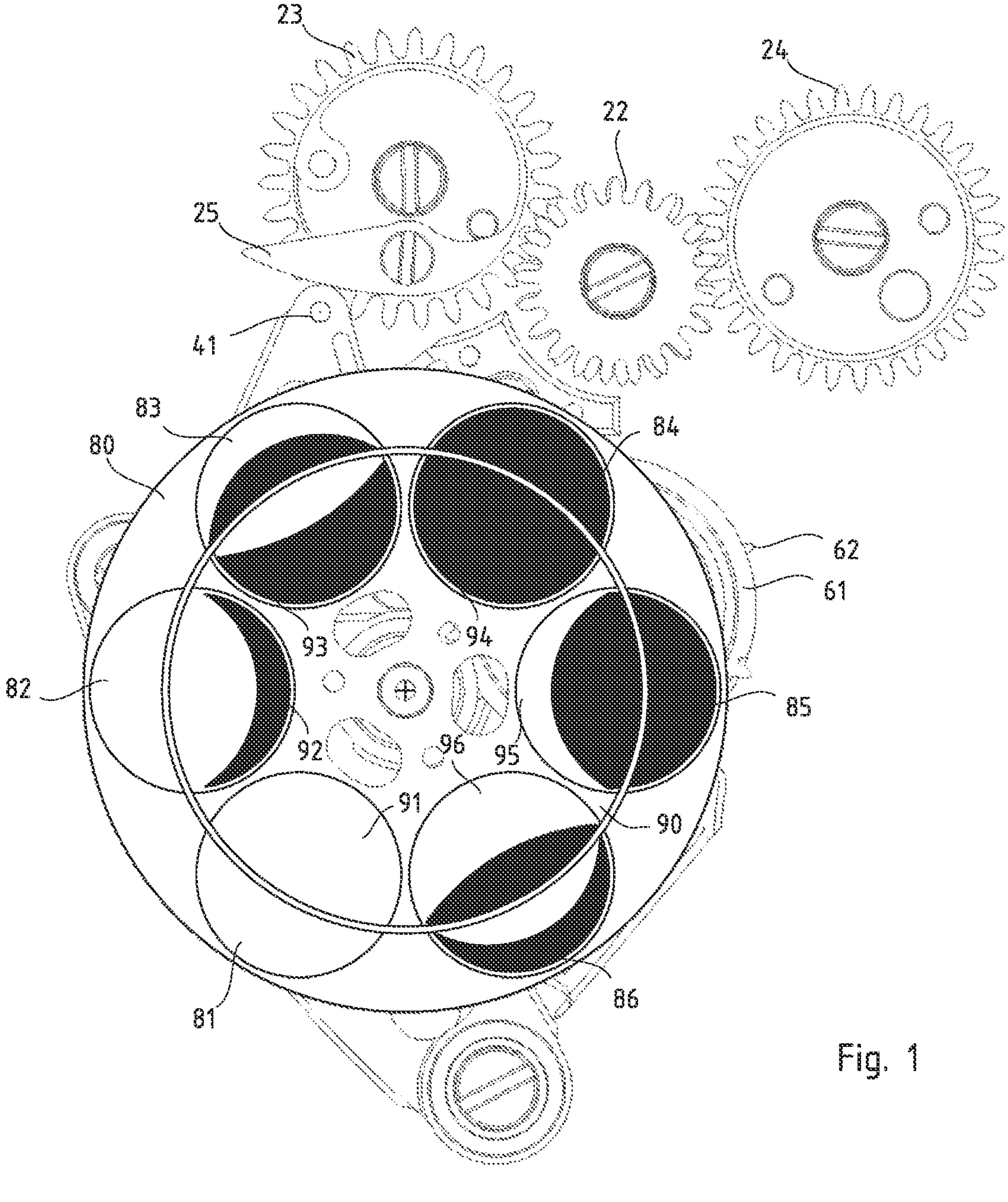
FIGS. 1 and 2 illustrate an embodiment of the device of the invention seen from the dial side.
Figure 2:
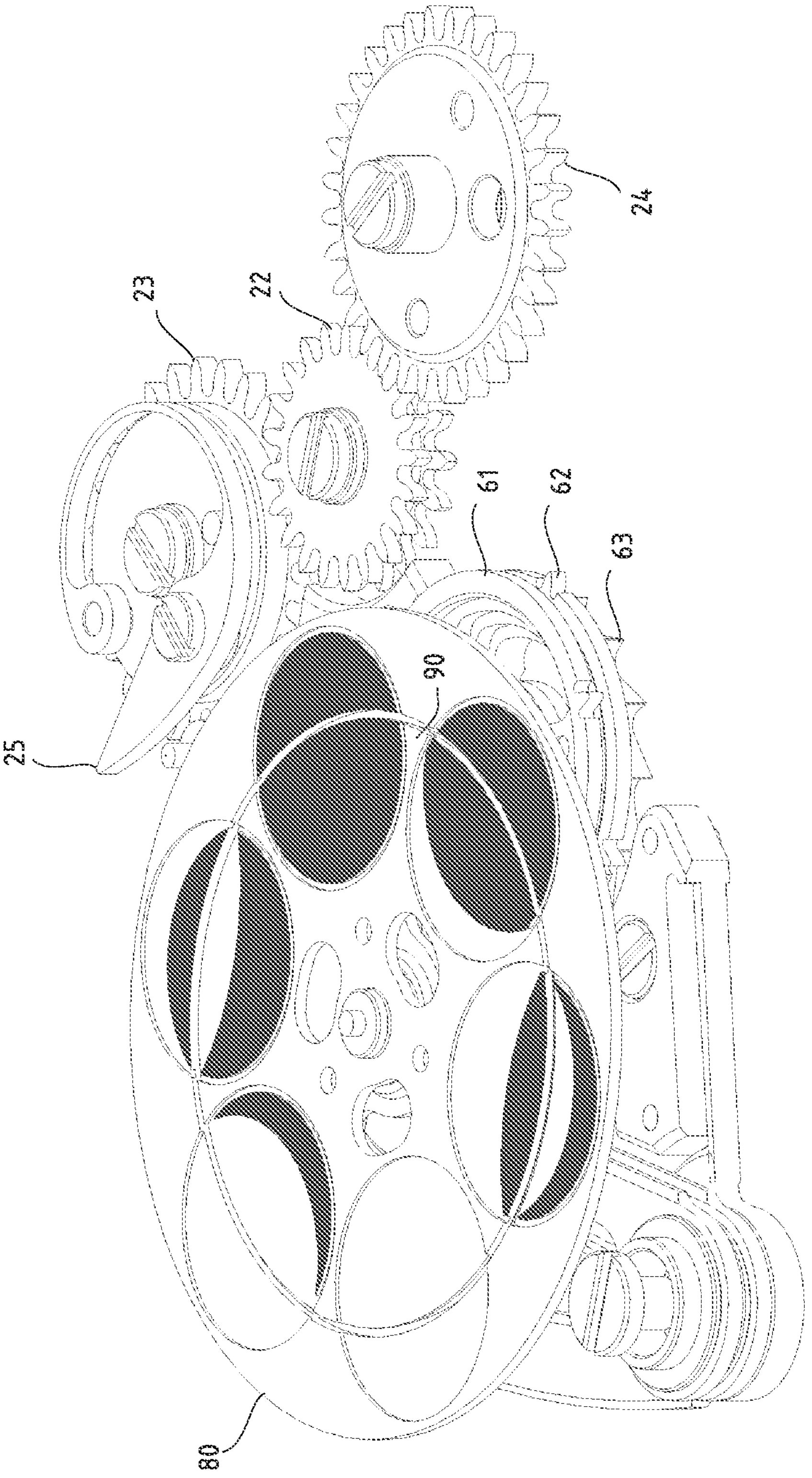

Referring to FIGS. 1 and 2, the display device of the invention comprises two disks 80, 90 each bearing a series of partial representations of the moon, as it appears at determined instants of the lunation. The first disk 80, in the form of a crown, encircles the disk 90 which is concentric to it and lies essentially in the same plane. The invention is not limited to this particular arrangement, the first disk also being able to be the inner disk. In the example represented, each of the two indicator disks 89, 90 bears a series of images of the same part of the moon. Two juxtaposed r partial images can give a realistic representation of the moon in predetermined phases of the lunation. Thus, the representation of the phases of the moon are combined by the juxtaposition of first and second complementary images occupying fixed and complementary portions of the lunar disk.

The disks of the example indicated each bear six partial images, and are actuated by a driving device which will be described below to give rise to ten different representations of the moon, each corresponding to a phase of the monthly cycle of the lunation. Each image of the moon is obtained by the composition of two partial images, a first image of the first disk 80, and a second image of the second disk 90, which are located at the same time juxtaposed under a window that is not represented, or another tell-tale, for example in the case of a skeleton watch. It will be noted that there are six different images on the inner disk 90, while the disk 80 bears four different images, the entirely light images 81, 82 and the entirely dark images 84, 85 being repeated twice identically for reasons of symmetry. The disk 80 could equally well bear 6 distinct images which would give rise to 12 different representations of the moon.

It is important to understand that the fact of having six partial images giving rise to ten different images of the moon is not an essential feature, but rather an advantageous trade-off between the will to exactly follow the progression of the lunar phases during the lunation, and the size of the display. The invention also encompasses embodiments with a different number of images. It would be possible to consider a variant capable of displaying up to 30 different images of the moon. Note, too, that the two disks do not necessarily have the same number of partial images.

The succession of the images in a particular order is ensured by driving means 22, 23, 25, 40, 41, 43, 63, 71, 72, 61, 62 arranged so as to displace, by successive jumps, the first and the second display members 80, 90 with reference to the display zone in order to display a succession of representations of the moon.

In the mechanism illustrated by way of example, the wheel 23 is driven by the wheel 24 which performs a complete revolution in one day, through the mobile 22, and its period of rotation is 23.625 hours. The wheel 23 bears a finger 25 which acts on the pin 41 to advance the disks 80 and 90. The finger 25 is preferably retractable to avoid unwanted corrections when making a backward setting. In other words, the assembly consisting of the wheels 22 and 23 and of the finger 25 constitutes an actuator capable of delivering a periodic impulse by being linked kinematically to the movement of the timepiece, in this particular case to the twenty-four-hour wheel 24.

The period of the display is a multiple of the impulse period of the actuator. In the mechanisms of the prior art, the number of images of equal periods dictates the period of activation of the display and, from the time base of the movement, the theoretical reduction ratio that makes it possible to obtain it. For reasons of bulk and of efficiency, the designer is limited to simple gears in which the reduction ratio is approximately the ratio sought. The display mechanism of the invention offers the advantage of making the impulse period independent of the number of images to be displayed by allowing the freedom to individually choose the display period of each image. That offers a high degree of freedom to design a mechanism in which the display period is as close as possible to the real lunation period. In the exemplary embodiment presented, a combination of 30 impulses and an impulse period of 23.625 hours has been chosen, which is obtained from the 24 h wheel. That corresponds to a period of the display cycle of 29 d 12 h and 45 min, very close to the real lunation period. The accuracy of such a display is 1 day/125 years which makes it possible to qualify it as astronomical moon. It should be noted that, with such a drive mechanism, it is possible to display the desired number of phases of the moon up to 30.

Figure 3:
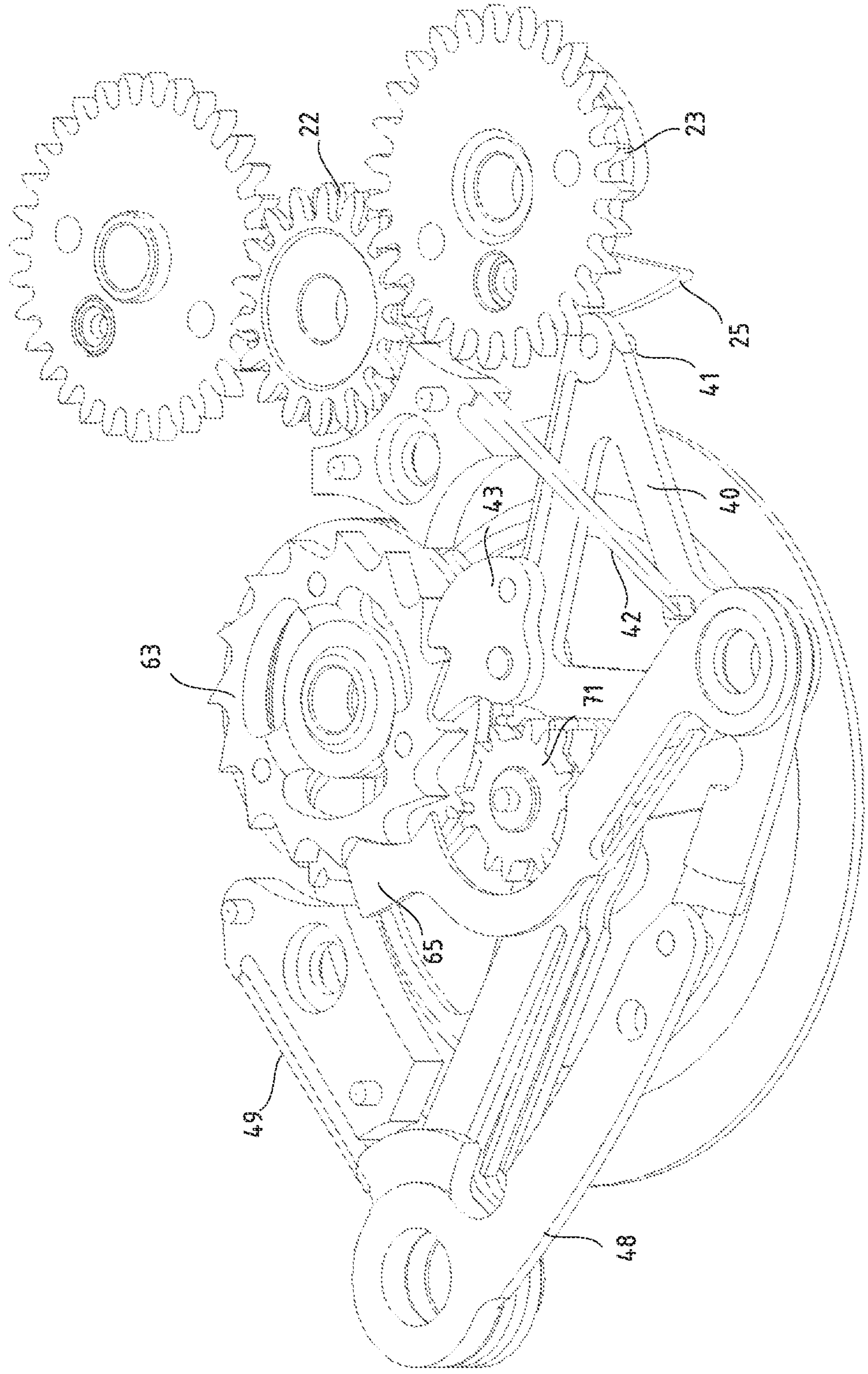
FIGS. 3 and 4 show the opposite face of the device of FIGS. 1 and 2.
Figure 4:
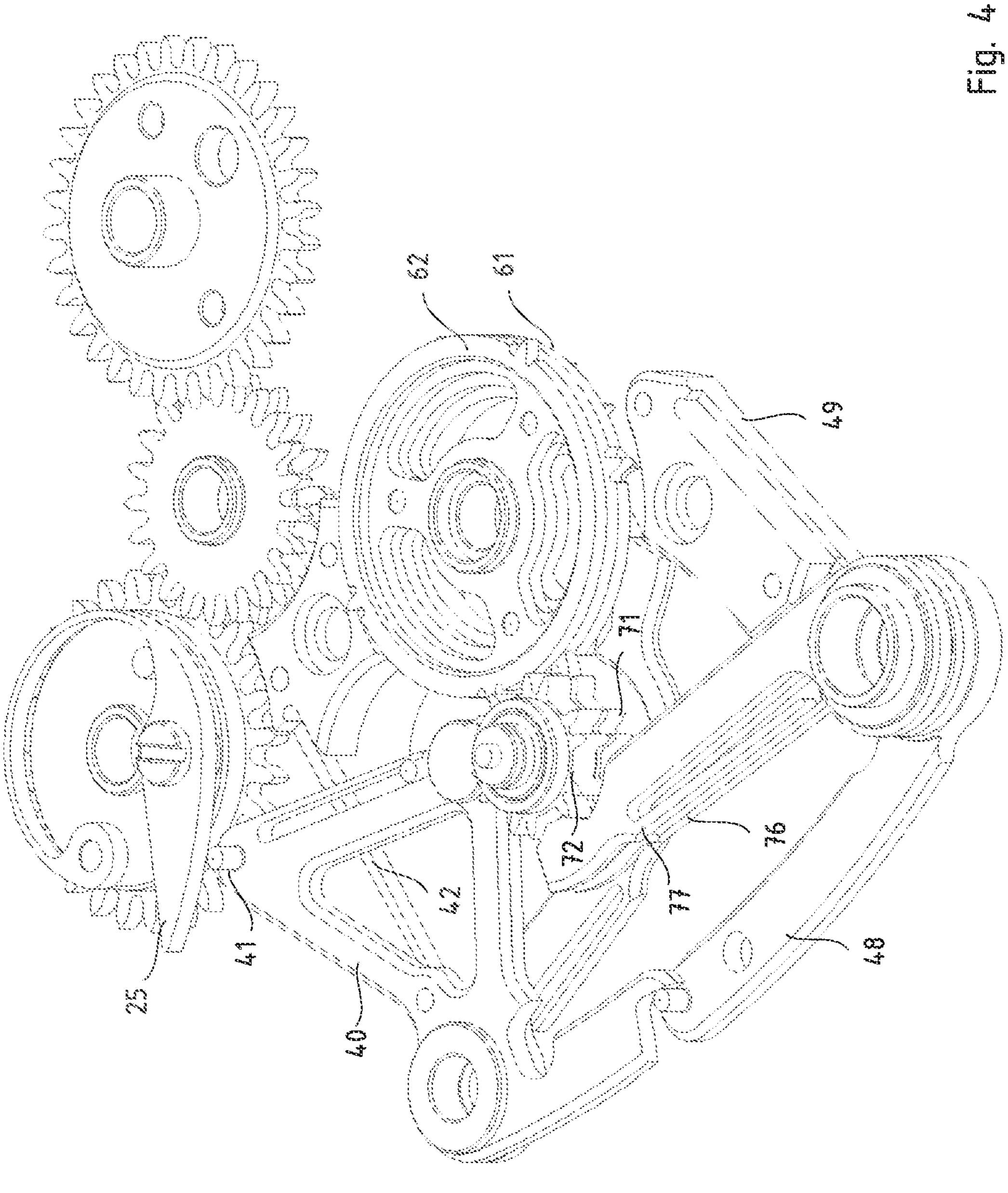

FIGS. 3 and 4 show the advance mechanism of the disks 80 and 90 which firstly comprises a lever 40 which is actuated thirty times per lunation by the wheel 23. The lever is kept in the rest position by the spring 42 and bears, at one end, a retractable ratchet 43 which, on each reciprocal action, advances the star wheel 63 by one notch. The ratchet 43 is designed so as to avoid any double jump of the star wheel 63. The jumper 65 also contributes to stabilizing the star wheel 63 when the lever 40 is raised and prevents the rotation of the star wheel in the reverse direction.

The correction lever 48 is kept in the rest position by the spring 49. Its function is to manually actuate the moon lever 40 independently of the position of the wheel 23, when a correction of the moon phase indication is necessary. Preferably, this finger 25 is retractable for safety reasons. In FIG. 4, which illustrates the display r mechanism of the invention without the indicator disks 80 and 90, it is possible to see the two program wheels 61 and 62 which are actuated and advance by a determined angle on each reciprocal movement of the lever 40, Each program wheel has an intermittent toothing with teeth at predetermined angular positions. The teeth of the program wheels cooperate with the two drive wheels 71 and 72 which, in turn, are integral to the first indicator disk 80, respectively to the second indicator disk 90.

When, on the occurrence of an impulse from the actuator, a tooth of the program wheel meshes with a drive wheel, the corresponding indicator disk makes a rotation of 60°, which corresponds to the transition between one image and the next. The jumpers 76 and 77 ensure the stability and the indexing of the indicator disks and the profile of the intermittent toothing of the program wheels is arranged to block the accidental rotation of the drive wheels and prevent any loss of synchronization.

The assembly formed by the lever 40, the ratchet 43, the star wheel 63, the program wheels 61,62 and the drive wheels 71, 72 constitutes a first selector and a second selector, which are capable of displacing the first display member and the second display member with reference to the display zone according to a predetermined sequence. The function of a selector is to displace a display member to pass from one image to the next, in response to n impulses from the actuator, n being an integer proportional to the period of display of the image considered. For at least one of the display members, the period of display is not identical for all images, in other words, the number n varies.

The use of the two independent program wheels for actuating the indicator disks 80 and 90 allows for a great degree of freedom of choice of the instants of transition between one image of the moon and the next. It is possible to position the teeth of the wheels 61 and 62 so as to display the full moon and the new moon for a single period delimited by two successive movements of the lever 40, that is to say 23.625 hours, while the waxing and waning moon phases remain visible for three or four periods. That makes it possible to precisely mark the full moon and the new moon in order to make the display more realistic and facilitate setting.

The invention relates also to a display device which would comprise only a single display member and in which the periods of display of each image would not all be equal.

Figure 5A:
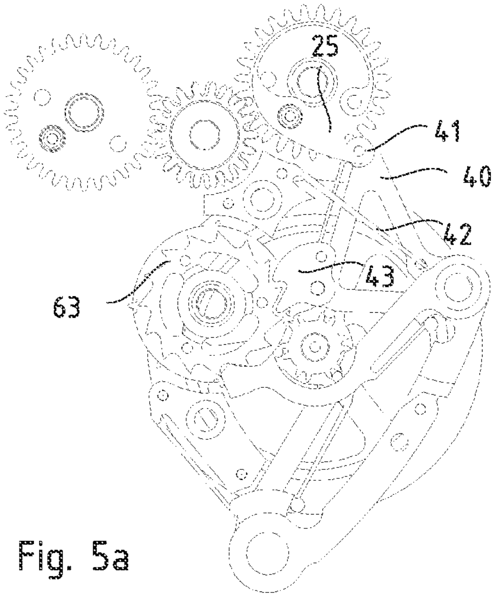
FIGS. 5*a* to 5*g* illustrate the different phases of a transition between two images of the moon.

The differentiated periods of display of such a device make it possible to make this display more realistic compared with those of the prior art, FIGS. 5*a* to 5*g* break down a reciprocal action of the moon lever 40. FIG. 5*a* represents the instant of the first contact between the finger 25 and the pin 41. The lever is in the rest position, the ratchet positioned between two teeth of the star wheel 63.

Figure 5B:
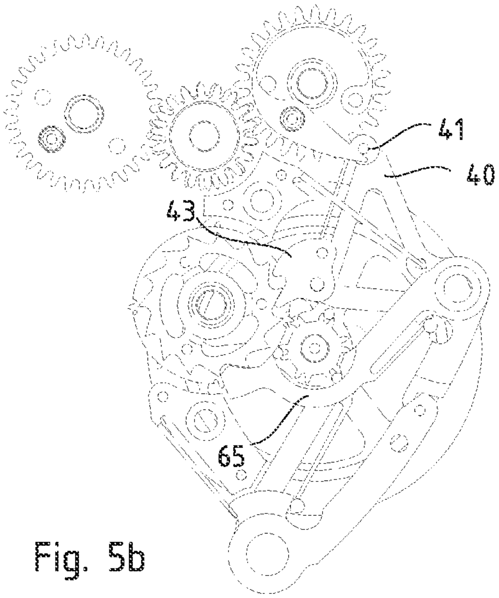
Figure 5C:
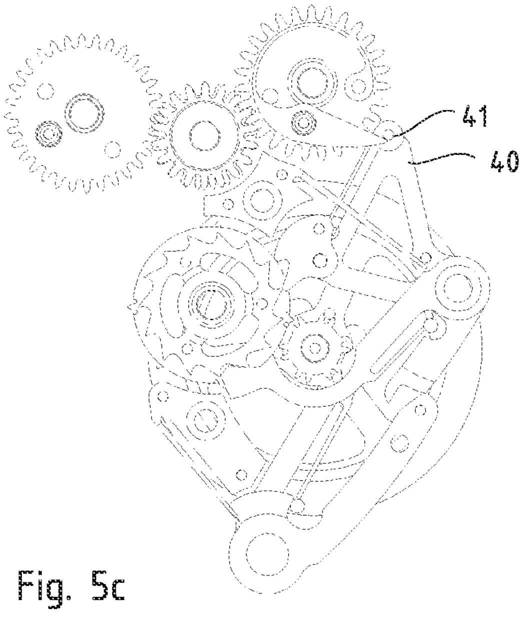
Figure 5D:
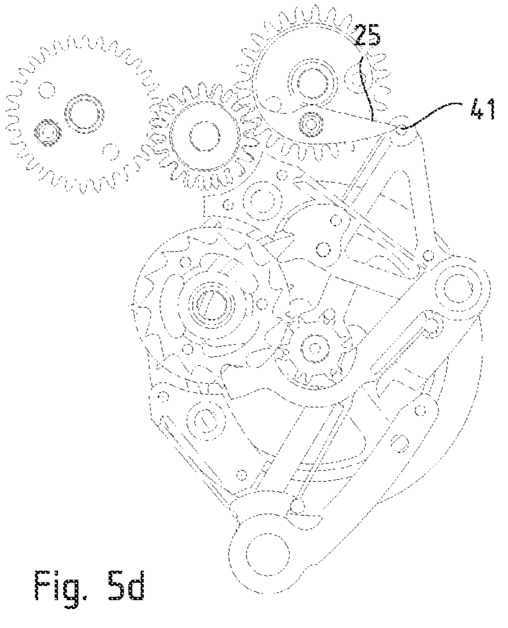
Figure 5E:
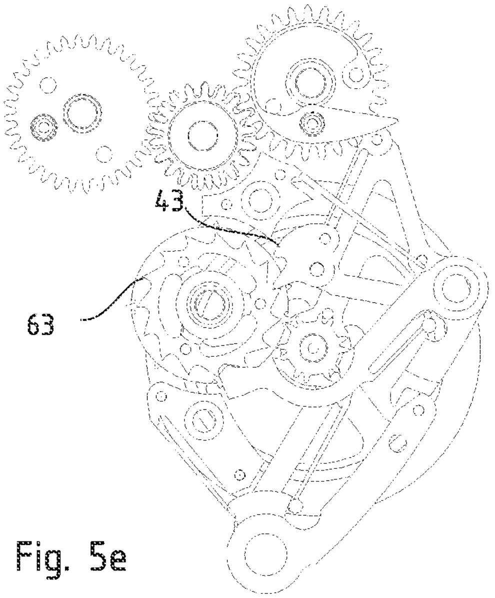

FIGS. 5*b* to 5*d* show three successive phases of the lifting of the moon lever. Up to the position represented in FIG. 5*c*, the ratchet 43 pivots in the counterclockwise direction and slips over the flank of a tooth without the wheel 63 moving, because it is held by the jumper 65 which blocks the counterclockwise rotation.

Figure 5F:
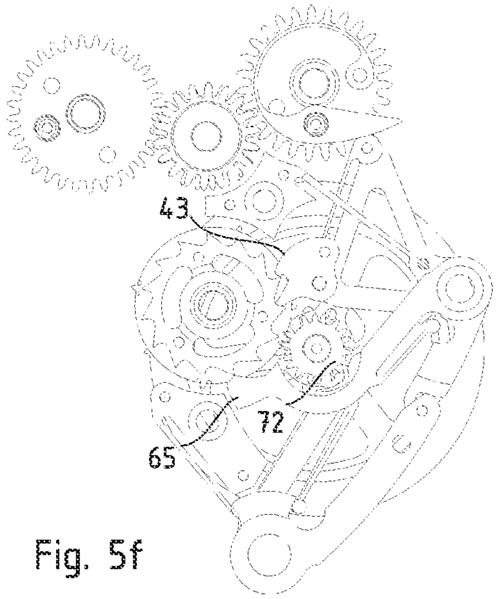
Figure 5G:
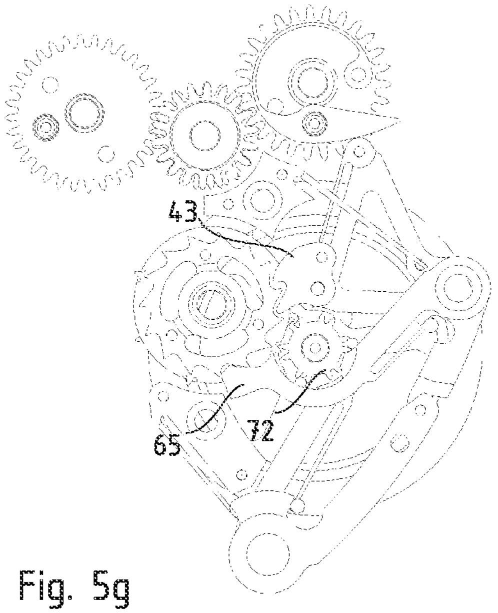

FIG. 5*d* shows the instant of disengagement between the finger 25 and the pin 41. The moon lever 40 is lifted and the spring 42 is armed to the maximum. At the next instant (FIG. 5*e*), the lever 40 promptly reverts to its rest position under the action of the spring 42 by driving the star wheel 63 in rotation via the ratchet 43 (FIGS. 5*f* and 5*g*). The drive wheel 72, and the display disk 80 which is integral to it, advance by $1/6^{th}$ of a revolution. The transition from one image to the next is instantaneous, which is preferable, because illegible "decomposed" indications are avoided, all the more so as the transitions are performed without respect to what time it is. A semi-instantaneous or dragging mechanisms would, however, be possible to consider.

The lever and its return spring progressively loaded by the action of the finger 25 constitute an instantaneous jump device. It should be noted that such an instantaneous jump device could be situated at another location, for example downstream of the selector.

Figure 6:
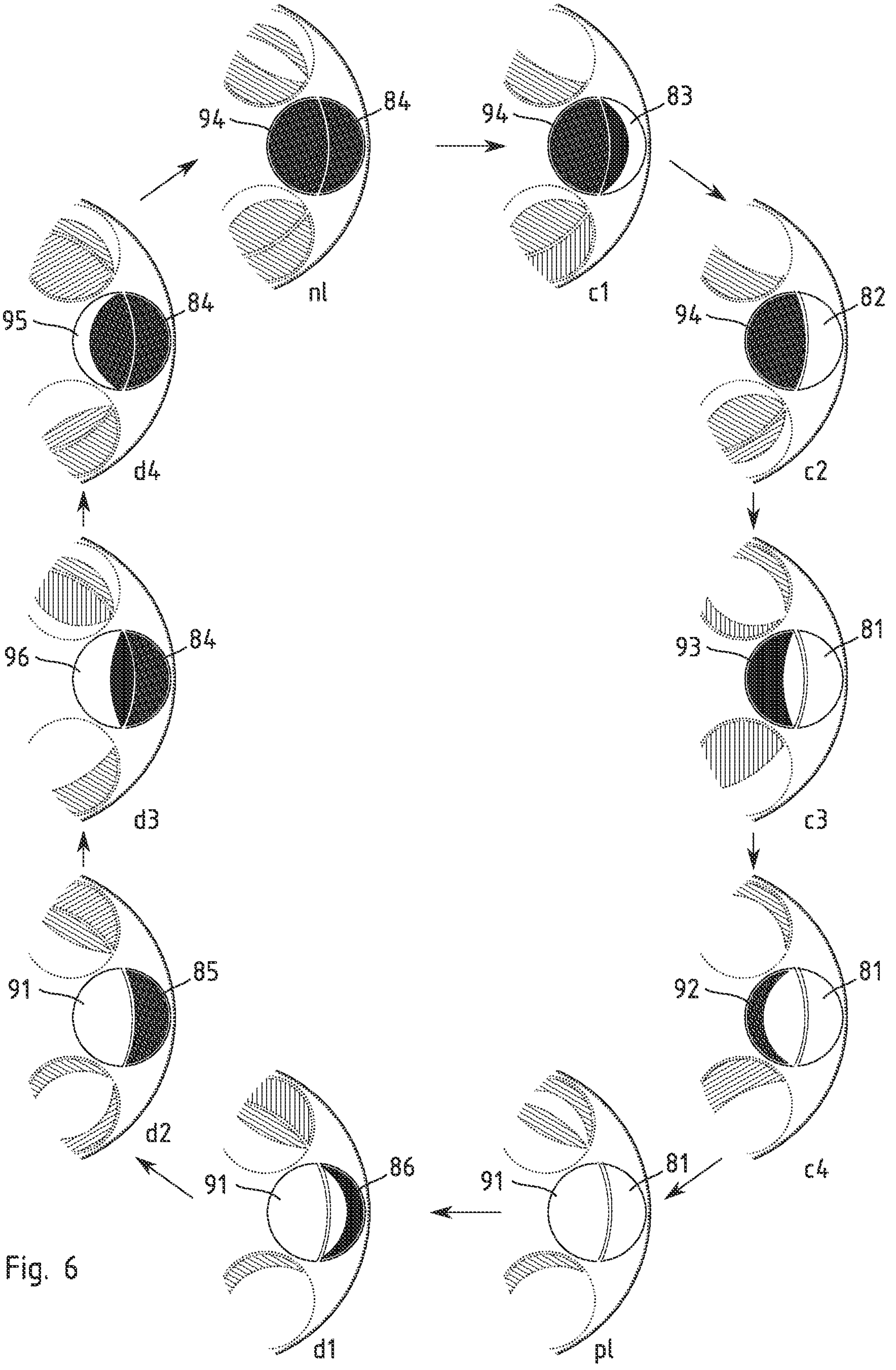
FIG. 6 illustrates the succession of images of the moon from one new moon to the next.

FIG. 6 illustrates the images of the moon that can be obtained by the juxtaposition of the partial images 81-86 and 91-96 of the two indicator disks (also visible in FIG. 1). The images that appear through the window are drawn in continuous lines and are solid, those concealed by the dial are drawn in broken lines and are shaded.

A lunation cycle begins with the new moon "nl", top left, and the two partial images 94 and 84 are visible. The juxtaposed images give an image of the black moon. At a moment defined by the profile of the corresponding program wheel, the outer disk performs a jump and shows the successive image 83. The two images under the window are composed to show the moon at its first (waxing) crescent "c1".

The program wheels are designed to once again advance, at defined moments, the outer disk to show the partial image 82, then the inner and outer disks, to give the image composed of 81 and 93, then, once again, the inner disk to display the partial image 92. As can be seen in the figure, that gives three images of the progressively waxing moon "c2", "c3", "c4".

The image 'pl' is that of the full moon, which is displayed when the inner disk 90 rotates to show the partial image 91. Then, the images 'd1', 'd2', 'd3', 'd4' show the moon in four progressively waning aspects.

Advantageously, the sequence of the actuations of the disks 80 and 90 is repeated identically twice in one lunation, by virtue of the symmetry between the waxing and waning phases of the moon. For that reason, the star wheel 63 has fifteen teeth and drives the program wheels at a rate of two revolutions per month. It would, however, be possible to also consider variants in which the program wheels perform one revolution per month or several revolutions per month.

Importantly, the disk 80 and the disk 90 are displaced by successive jumps, under the action of the drive means comprising the intermediate wheel 22, wheel 23, finger 25, lever 40, catch 41, ratchet 43, star wheel 63, drive wheels 71 and 72, and program wheels 61, 62, so as to show, in the display zone defined by the window, partial representations of the moon, and the periods of display of these representations are not all equal.

REFERENCE NUMBERS EMPLOYED IN THE FIGURES

22 intermediate wheel
23 23.625 hour wheel
24 24 hour wheel
25 retractable finger
40 moon lever
41 catch, pin
42 moon lever spring
43 ratchet
48 correction lever
49 correction spring
61 first program wheel
62 second program wheel
63 star wheel of 15 teeth
65 jumper of the star wheel of 15 teeth
71 first drive wheel
72 second drive wheel
76 first wheel jumper

77 second wheel jumper
80 first display disk
81-86 partial representations of the moon
90 second display disk
91-96 partial representations of the moon

The invention claimed is:

1. A device for displaying phases of a moon for a timepiece comprising:

a first display member bearing a plurality of first images at least partially representing the moon;

a display zone;

a driving unit arranged to move, by successive jumps, the first display member relatively to the display zone in order to display a succession of representations of the moon, wherein said driving unit is adapted to move the first display member by successive jumps at variable time intervals such that periods of display of the first images are not all equal.

2. The device for displaying phases of the moon of claim 1, wherein the driving unit comprises:

an actuator intended to be linked kinematically to a movement of the timepiece so as to provide a periodic impulse, a first selector arranged to displace the first display member with reference to the display zone in order to display a next first image, in response to "n" impulses from the actuator, "n" being an integer proportional to a period of display of a considered first image, "n" not being identical for all the first images.

3. The device for displaying phases of the moon of claim 2, comprising an instantaneous jump device provoking an instantaneous advance of the first display member with reference to the display zone.

4. The device for displaying phases of the moon of claim 2, comprising a second display member bearing second images and that can be displaced with reference to the display zone by the driving unit to successively show the second images in the display zone and form, in combination with a first image of the first display member, a representation of a phase of the moon.

5. The device for displaying phases of the moon of claim 4, wherein the representations of the phase of the moon are combined by the juxtaposition of complementary first and second images occupying fixed and complementary portions of a lunar disk.

6. The device for displaying phases of the moon of claim 4, wherein the first and second display members are two concentric disks.

7. The device for displaying phases of the moon of claim 4, wherein the driving unit comprises a second selector arranged to displace the second display member with reference to the display zone in order to display a next second image, in response to m impulses from the actuator, m being an integer proportional to a period of display of a considered second image, m being able to vary from one second image to another.

8. The device for displaying phases of the moon of claim 7, wherein the first selector comprises a first program wheel for actuating the first display member at predetermined instants of the lunation.

9. The device for displaying phases of the moon of claim 8, wherein the second selector comprises a second program wheel for actuating the second display member at predetermined instants of the lunation.

10. The device for displaying phases of the moon of claim 9, wherein said first and second program wheels are integral.

11. The device for displaying phases of the moon of claim 9, wherein said first and second program wheels are driven by two revolutions during a lunation.

12. A timepiece comprising the device for displaying phases of the moon of claim 1.

* * * * *